(12) United States Patent
Luebbert et al.

(10) Patent No.: US 8,704,704 B2
(45) Date of Patent: Apr. 22, 2014

(54) MOTOR VEHICLE RADAR SYSTEM, AND METHOD FOR DETERMINING SPEEDS AND DISTANCES OF OBJECTS

(75) Inventors: Urs Luebbert, Bietigheim-Bissingen (DE); Udo Haberland, Holzgerlingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 1046 days.

(21) Appl. No.: 12/303,913

(22) PCT Filed: Jun. 16, 2007

(86) PCT No.: PCT/EP2007/005315
§ 371 (c)(1),
(2), (4) Date: Dec. 8, 2008

(87) PCT Pub. No.: WO2007/147533
PCT Pub. Date: Dec. 27, 2007

(65) Prior Publication Data
US 2011/0181456 A1    Jul. 28, 2011

(30) Foreign Application Priority Data
Jun. 21, 2006   (DE) .......................... 10 2006 028 465

(51) Int. Cl.
*G01S 13/93*    (2006.01)
*G01S 13/28*    (2006.01)
*G01S 13/00*    (2006.01)

(52) U.S. Cl.
USPC ............... 342/132; 342/27; 342/89; 342/104; 342/107; 342/109; 342/115; 342/118; 342/128; 342/130; 342/131; 342/133; 342/146; 342/147; 342/175; 342/195

(58) Field of Classification Search
USPC ......... 342/27, 28, 70–72, 118, 128–133, 146, 342/147, 175, 195, 82, 89–115
See application file for complete search history.

(56) References Cited

U.S. PATENT DOCUMENTS 3,778,823 A * 12/1973 Sato et al. ...................... 342/72
4,180,816 A * 12/1979 Endo et al. ..................... 342/70

(Continued)

FOREIGN PATENT DOCUMENTS

DE    696 12 252 T4    4/1997
DE    196 48 203 A1    6/1998

(Continued)

OTHER PUBLICATIONS

International Search Report w/translation from PCT/EP2007/005315 dated Aug. 22, 2007 (6 pages).

*Primary Examiner* — Bernarr Gregory
(74) *Attorney, Agent, or Firm* — Osha Liang LLP (57) ABSTRACT

Presented is a method for determining speeds (vr14, vr16) and distances (r14, r16) of objects (14, 16) relative to a radar system (12) of a motor vehicle (10), wherein a coverage area (EB) of the radar system (12) is divided into at least two part-areas (TB1, TB2, TB3), the coverage area (EB) is examined for reflecting objects (14, 16) in successive measuring cycles (MZ1, MZ2; MZi, MZi+1), wherein radar signals received in a measuring cycle (MZ1, MZ2; MZi, MZi+1) are processed separated in accordance with part-areas (TB1, TB2, TB3) and processed signals are assembled to form a total result differentiated in accordance with spatial directions. The method is characterized in that from signals received in a first measuring cycle (MZ1; MZi), hypotheses for the distance (r14, r16) and speed (vr14, vr16) of reflecting objects (14, 16) are formed and the hypotheses are validated in dependence on signals received in at least one further measuring cycle (MZ2; MZi+2). Furthermore, a radar system (12) is presented which carries out such a method.

10 Claims, 5 Drawing Sheets

(56) References Cited

U.S. PATENT DOCUMENTS

| | | | |
|---|---|---|---|
| 5,598,163 A * | 1/1997 | Cornic et al. | 342/70 |
| 5,617,098 A * | 4/1997 | Koyanagi et al. | 342/70 |
| 5,684,490 A * | 11/1997 | Young et al. | 342/70 |
| 5,712,640 A * | 1/1998 | Andou et al. | 342/70 |
| 5,717,399 A * | 2/1998 | Urabe et al. | 342/70 |
| 5,734,344 A * | 3/1998 | Yamada | 342/72 |
| 5,745,070 A * | 4/1998 | Yamada | 342/70 |
| 5,757,307 A * | 5/1998 | Nakatani et al. | 342/70 |
| 5,818,355 A * | 10/1998 | Shirai et al. | 342/70 |
| 5,929,803 A * | 7/1999 | Uehara et al. | 342/70 |
| 5,933,109 A * | 8/1999 | Tohya et al. | 342/175 |
| 5,945,939 A * | 8/1999 | Iihoshi | 342/70 |
| 5,949,365 A * | 9/1999 | Wagner | 342/70 |
| 5,999,092 A * | 12/1999 | Smith et al. | 342/71 |
| 6,005,511 A * | 12/1999 | Young et al. | 342/70 |
| 6,028,548 A * | 2/2000 | Farmer | 342/70 |
| 6,107,956 A * | 8/2000 | Russell et al. | 342/70 |
| 6,246,357 B1 * | 6/2001 | Uehara | 342/70 |
| 6,246,359 B1 * | 6/2001 | Asano et al. | 342/128 |
| 6,380,884 B1 * | 4/2002 | Satou et al. | 342/70 |
| 6,573,859 B2 * | 6/2003 | Tokoro | 342/70 |
| 6,628,227 B1 * | 9/2003 | Rao et al. | 342/70 |
| 6,646,589 B2 * | 11/2003 | Natsume | 342/70 |

FOREIGN PATENT DOCUMENTS

| | | |
|---|---|---|
| DE | 197 14 570 A1 | 10/1998 |
| DE | 199 22 411 A1 | 10/2000 |
| DE | 103 55 796 A1 | 6/2005 |
| EP | 1 548 458 A2 | 6/2005 |
| WO | 2005/124391 A1 | 12/2005 |
| WO | 2006/034888 A1 | 4/2006 |

* cited by examiner

MOTOR VEHICLE RADAR SYSTEM, AND METHOD FOR DETERMINING SPEEDS AND DISTANCES OF OBJECTS

FIELD OF THE INVENTION

The invention relates to a method for determining speeds and distances of objects relative to a radar system of a motor vehicle, wherein a coverage area of the radar system is divided into at least two part-areas, the coverage area is examined for reflecting objects in successive measuring cycles, wherein radar signals received in a measuring cycle are processed separated in accordance with part-areas and processed signals are assembled to form a total result differentiated in accordance with spatial directions. The invention also relates to a radar system which is arranged for carrying out the method.

BACKGROUND OF THE INVENTION

Such a method and such a radar system is in each case known from DE 696 12 252 T2.

In road motor vehicles, radar systems are used for monitoring the vehicle environment, considering applications such as parking aid, monitoring of dead angle, track-change assistance, door-opening assistance, pre-crash sensing for triggering an airbag, belt tightening, roll bar activation, start/stop operation, stop and follow operation or driving operation with distance monitoring and/or distance control (cruise control support).

There are typically several objects and spatially extended objects (vehicles, crash barriers, bridges) present in the environment of the vehicles so that, as a rule, several reflection points occur in the same distance cell. To enable the driver or a driver assistance system to estimate the situation, the speed and possibly also the angular position of reflecting or scattering objects must also be determined in addition to the distance. A suppression of infrastructure, that is to say, for example, of stationary objects such as crash barriers at the edges of the carriageway, represents a further important requirement for a motor vehicle radar system.

The motor vehicle radar system initially mentioned uses a segmentation of a coverage area of the radar system by means of a sequential overlay with a number of part-areas to which in each case an angular segment from the coverage area is allocated. The segmentation is done with the aid of several spatially separate receiving antennas which can be connected together in pairs in each case. By combining different receiving antennas of the radar system, different part-areas are generated in DE 696 12 252 which, together, produce a comparatively large azimuthal coverage area.

Within a part-area, an FMCW (frequency modulated continuous wave) method is used. In this method, the frequency of the radar signals emitted by the radar system is increased and reduced again in a ramp form. Each individual frequency ramp is also called a chirp. Radar signals reflected from an object and subsequently received by the radar system are mixed down into the baseband with the instantaneous transmit signal in the radar system. For an object in the coverage area of the radar, a harmonic oscillation with a frequency which corresponds to the difference between the instantaneous transmit signal frequency and the received signal frequency (before the mixing) is obtained in the baseband received signal. Since a signal propagation time which depends on the distance r of the radar system from the reflecting object elapses between the sending and the receiving of the radar signals, the distance r is reflected in this difference frequency. Due to the Doppler effect, the radial relative speed vr, that is to say that present in the direction of a connecting line between the radar system and reflecting object, is also reflected in the difference frequency f. In this context, the two dependencies satisfy the linear equation $$f = a*r + b*vr,$$

with coefficients a and b which depend on the chirp parameters transmitting start frequency f0, chirp length TC and frequency change dfC. The values of the difference frequency f are usually determined by Fourier transform and threshold value detection in the frequency domain.

By means of the linear relationship f=a*r+b*vr, each measured value of the difference frequency f can be represented as a straight line in an r, vr diagram, the slope of the straight line depending on the coefficients a, b and thus on the said chirp parameters. With a ramp-shaped increase in frequency (up-chirp), a different straight line is obtained than with the ramp-shaped reduction in frequency (down-chirp). The intersection of the two straight lines provides the required distance and required relative speed of a single reflecting object. A linear system of equations describes the relation between the object parameters r and vr and the difference frequencies determined. This is already described, for example, by DE 2 305 941.

In situations with a number of reflecting objects, the number of intersections increases with the number of reflecting objects. Each further object provides, in addition to the informative intersection of its two associated straight lines, further intersections with straight lines which belong to the other objects. Since these further intersections do not characterize a real object, they are also called ghost targets.

In such situations with n objects, it becomes necessary to validate the significant intersections, that is to say the r, vr combinations of real objects and thus to separate them from the r, vr combinations of the ghost targets.

For such a validation, it is known from DE 42 44 608 A1 to carry out further measurements which supply additional relationships between the object parameters r and vr and the measurement values for the validation. In this context, a use of further frequency ramps with different slopes is known from DE 199 22 411 A1. In this case, it is checked whether the expected frequencies are measured for a physically possible r, vr combination in the further frequency measurements. This is checked with Nearest Neighbour and Gate methods. An r, vr combination is validated if a difference between an expected frequency and the nearest measured frequency is less than a predetermined threshold value. Following this, the validated r, vr combinations are processed further in the so-called target tracker. In this context, the tracker detects and suppresses individual incorrect r, vr combinations (that is to say ghost targets) by means of an additional validation algorithm.

In DE 696 12 252 T4, it is possible to switch between the individual combinations of receiving antennas by means of which part-areas of a relatively large coverage area are selected. To detect objects in the entire coverage area, the individual part-areas have to be selected sequentially. The duration of an individual measuring cycle by means of which the coverage area is checked once for objects is determined by the product of the measured period required per part-area and the number of part-areas.

In the abovementioned applications for road motor vehicles, a high update rate and thus a short period of a measuring cycle of the order of magnitude between 10 ms to 100 ms is demanded, among other things. On the other hand, the Doppler frequency, and thus the speed of an object, can be determined all the more accurately the longer the frequency ramps of individual chirps are. The more different chirps are used for measuring and validating, the more reliably distances and speeds of real objects can be validated in order to distinguish them from ghost targets.

The requirements for a high update rate and for accuracy of the measurements and reliability of the validation thus result in a target conflict.

Against this background, the object of the invention consists in specifying a method and a radar system of the type in each case mentioned initially by means of which a high measuring accuracy and reliable distinction of real objects from ghost targets can be achieved with a high update rate.

SUMMARY OF THE INVENTION

In a method of the type initially mentioned, this object is achieved in that from signals received in a first measuring cycle, hypotheses for the distance and speed of reflecting objects are formed and the hypotheses are validated in dependence on signals received in at least one further measuring cycle. Furthermore, this object is achieved by the characterizing features of claim 10 in a radar system of the type initially mentioned.

In other words: the invention allows a hypothesis to be formed on whether an intersection of two straight lines relates to parameters of a real object or to a ghost target, by a single pair of chirps for a part-area of an arbitrary first measuring cycle. It also allows the hypothesis to be validated (confirmed) or discarded by evaluating measurements in at least one later measuring cycle. As a consequence, the first measuring cycle can already be ended before the measurement results or the hypotheses derived therefrom are finally validated or discarded. As a result, the duration of the individual measuring cycles can thus be reduced which allows a higher updating rate. The higher updating rate is achieved without losses in the reliability of the validation since the number of chirps used for a validation does not have to be reduced. It is only that chirps from different measuring cycles are used for the validation. As a result, the invention allows the said target conflict to be resolved both in its method aspects and in its device aspects.

In this context, the processing separated in accordance with part-areas is carried out in one embodiment in that the radar system directs an overlay of a transmitting lobe and of an angular receiving area, defining part-areas, sequentially in different spatial directions in one measuring cycle and the processing of received radar signals is carried out sequentially.

Due to this embodiment, the processing of the radar signals, separated in accordance with part-areas, occurs separated in time. Due to the temporal separation, the processing can take place in each case in the same receiving channel so that this embodiment only requires one receiving channel for processing the radar signals.

In an alternative embodiment, the processing separated in accordance with part-areas is carried out in that the radar system simultaneously directs overlays of at least one transmitting lobe with at least two angular receiving areas or at least one angular receiving area with at least two transmitting lobes, defining different part-areas, in different spatial directions, wherein, for one part-area (i.e. for one overlay), signals are processed from another received signal frequency range than for another part-area.

This embodiment allows a simultaneous measurement in several part-areas which further increases the update rate and validation speed. However, the simultaneous signal processing requires several receiving channels and thus a higher expenditure in technical apparatus.

It is also preferred that the hypotheses are formed by an LFMCW (linear frequency modulated continuous wave) method in which two frequency ramps with different slope are used for each overlay.

Using these two frequency ramps allows this embodiment to form a hypothesis by determining the intersections of resulting straight lines with little required measuring time for a part-area. This, too, contributes to a desirably high updating rate.

A further embodiment is distinguished by the fact that at least four different frequency ramps, of which two are in each case located in one of two different measuring cycles, are used for the measurement and validation. A first measuring cycle is used for the measurement and a second measuring cycle is used for the validation. To achieve a high updating rate, the results from one measuring cycle can be used for validating a measurement from a preceding measuring cycle and/or as measurement values which are still to be validated by a subsequent measuring cycle. This results in a high updating rate.

As an alternative or additionally, the validation can also be carried out by observing and evaluating changes of pairs of combinations of distances and speeds found from measuring cycle to measuring cycle. In this context, the speed is additionally determined by a range rate method in which the change of a pair is determined from in each case one value for the distance r and one value for the speed vr between two measuring cycles. In the case of a real object, in particular, the change of the distance, after normalization for the time interval between the measuring cycles, must correspond to the speed vr which is obtained from the difference frequency. For this purpose, a use of frequency ramps having the same sign but different amount of slope is not absolutely necessary.

It has also been found to be suitable to alternately use a first pair of frequency ramps and a second pair of frequency ramps for in each case identical overlays in successive measuring cycles. This contributes to a high updating rate and, in conjunction with different slopes, allows a reliable validation.

It is also preferred that the respective four frequency measurements of two successive measuring cycles are used for forming hypotheses and validating hypotheses, wherein the first two frequency measurements are used for forming hypotheses and the further two frequency measurements are used for validation. In this context, a pair of frequency measurements can be used both for validating a previously formed hypothesis and for forming a hypothesis which is still to be validated in a later measuring cycle.

Since the reliability of the validation increases with the number of chirps used, two frequencies which are measured in a first measuring cycle are used for forming hypotheses and frequencies which are formed in more than one further measuring cycle are used for validation in a further embodiment.

Further advantages are obtained from the description and the attached figures.

Naturally, the aforementioned features and those still to be explained in the text which follows can be used not only in the combination specified in each case but also in other combinations or themselves without departing from the context of the present invention.

BRIEF DESCRIPTION OF THE DRAWINGS

Illustrative embodiments of the invention are shown in the drawings and will be explained in greater detail in the subsequent description. The drawings show, in each case in diagrammatic form, in.

DETAILED DESCRIPTION

Figure 1:
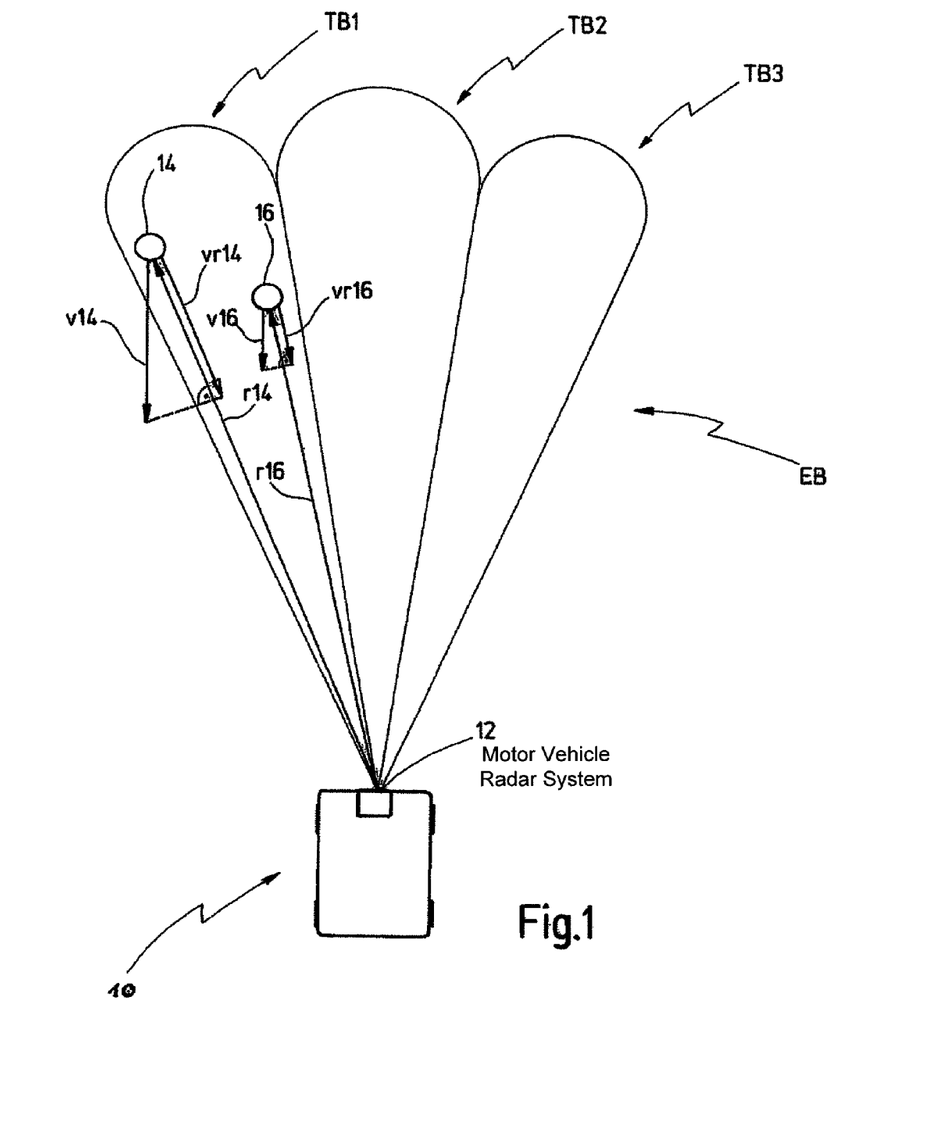
FIG. 1 a motor vehicle with a coverage area of a radar system.

FIG. 1 shows a motor vehicle 10 with a motor vehicle radar system 12 which determines radial components vr14, vr16 of speeds v14, v16 and distances r14, r16 of objects 14, 16 relative to the motor vehicle 10. In this context, the radar system 12 is arranged for using a coverage area EB divided into N=3 part-areas TB1, TB2, TB. Other values N greater than or equal to 2 are also possible. Each part-area TB1, TB2, TB3 is implemented as overlay of a transmitting lobe and of an angular receiving area.

The overlays point in various spatial directions and, in a first embodiment, are sequentially activated in a measuring cycle so that the radar system 12 examines the coverage area EB section by section for reflecting objects 14, 16. Each examination in one of the part-areas will also be called individual measurement in the text which follows. In the same way in which the part-areas TB1, TB2, TB3 together produce the coverage area EB, the duration of a measuring cycle is obtained as the sum of the periods of the individual measurements in the part-areas of the coverage area EB.

After such an examination of all part-areas TB1, TB2, a new measuring cycle is performed in each case. Radar signals received by the radar system 12 in one measuring cycle MZ are processed separated in accordance with part-areas TB1, TB2, TB3 and processed signals are combined to form a total result differentiated in accordance with spatial directions. The total result is indicated to the driver of the motor vehicle 10, for example, by means of a screen representation. As an alternative or additionally, the total result is used further as part of one or more of the exemplary applications mentioned initially, for example for distance control.

The radar system 12 is also arranged for forming from signals received in a first measuring cycle hypotheses for the distance r14, r16 and speed vr14, vr16 of reflecting objects 14, 16 and for validating the hypotheses in dependence on signals received in at least one further measuring cycle.

Figure 2:
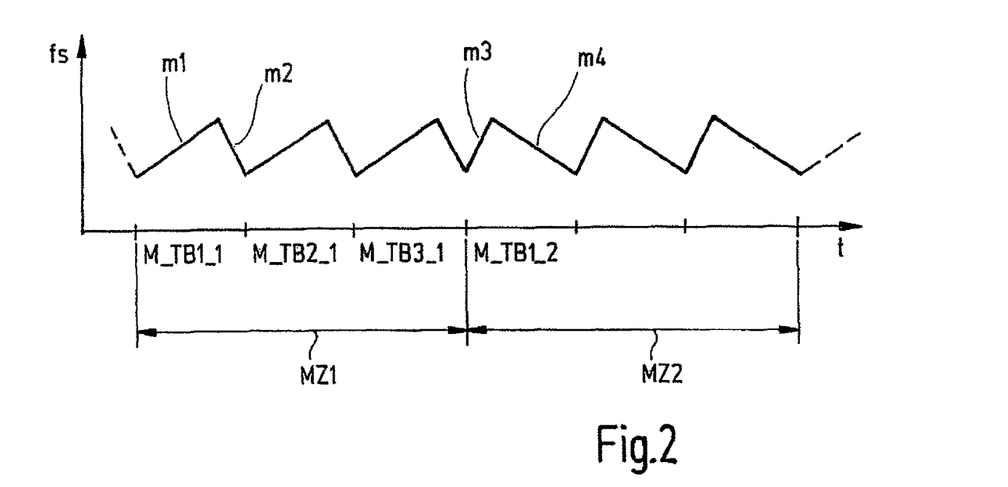
FIG. 2 a frequency modulation which is used in an embodiment of a method according to the invention.

In a preferred embodiment, the hypotheses are formed by an LFMCW method. FIG. 2 diagrammatically shows the variation with time of the frequency fs of the radar signals emitted by the radar system 12 in two successive measuring cycles MZ1, MZ2. In this context, the frequency fs of the emitted radar signals is modulated in a predetermined manner for each part-area TB1, TB2, TB3. In the embodiment of FIG. 2, the modulation is carried out in such a manner that the frequency fs in the measuring cycle MZ1 is initially increased linearly in dependence on time t with a first slope dfs/dt=m1 for each part-area TB1, TB2, TB3 and is then linearly decreased in dependence on time with a second slope dfs/dt=m2. In this context, the order of frequency increase and frequency reduction is not important.

To each part-area TB1, TB2, a measuring period M_TB1_1, M_TB2_1, M_TB3_1 is allocated in which the radar system 12 receives reflected radar signals from the in each case associated part-area TB1, TB2, TB3 when one or more reflecting objects 14, 16 are located there. In this context, the first number in each case numbers the part-area and the second number numbers the measuring cycle. A measuring cycle corresponds to the period in which the coverage area EB has been examined completely once.

In the conditions drawn diagrammatically in FIGS. 1 and 2, the processing of the radar signals received for the first part-area TB1 in the first measuring cycle MZ1 results for each object 14, 16 and each slope m1, m2 in a respective frequency value as difference between the frequencies of transmitted and received radar signals depending on the distance r14, 16 and the speed vr14, vr16. Each difference frequency in each case corresponds to a straight line G(m1, 14), G(m2, 14) and G(m1, 16) and G(m2, 16) in an r, vr diagram shown qualitatively in FIG. 3. The four intersections S1, S2, S3, S4 specify possible pairs of values (R, vr) of the two objects 14, 16, only the two pairs of values S1, S3 of which, however, correspond to reality and the other two pairs of values S2, S4 of which are so-called ghost targets.

In principle, the real pairs of values S1, S3 can be distinguished from the ghost targets S2, S4 by further measurements. If, for example, a further frequency ramp with a different slope were to follow the two frequency ramps with slopes m1, m2 in the part-area TB1, two further straight lines would be obtained for the two objects 14, 16 and thus further intersections in the representation of FIG. 3. In an idealized consideration, the further straight lines would extend through the intersections S1, S3 of the real pairs of values but not through the intersections S2, S4 of the ghost targets. The evaluation of the intersections of the further straight lines with the remaining straight lines thus provides a criterion for distinguishing real pairs of values S1, S3 from the ghost targets S2, S4.

Figure 3:
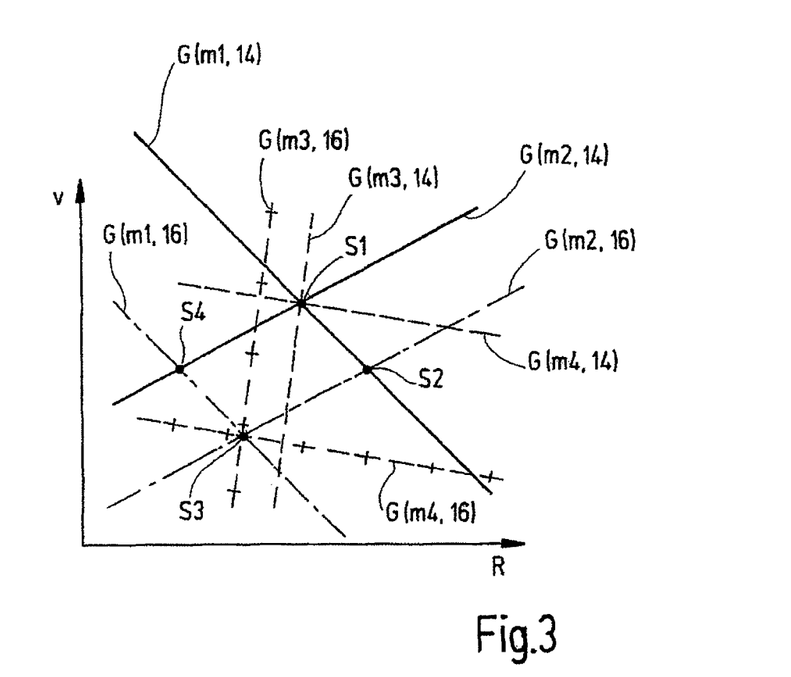
FIG. 3 a plot of results of a difference frequency detection in a distance/relative speed diagram.

In the context of the invention, this distinction is not made by transmitting, receiving and evaluating further frequency ramps for an individual part-area TB in a single measuring cycle. Instead, hypotheses are formed for the distances r14, r16 and speeds vr14, vr16 of reflecting objects 14, 16 in a first measuring cycle MZ1 and these hypotheses are discarded or validated (confirmed) by evaluating radar signals in a further measuring cycle MZ2. In one embodiment, the hypotheses are formed by the described evaluation of the resultant difference frequencies when using the two frequency ramps with slopes m1 and m2, that is to say by determining all intersections S1 to S4 including the pairs of values of the ghost targets. These are initially stored by the radar system 12 for the part-area TB1. Each intersection S1, S2, S3, S4 corresponds to a hypothesis for a possible pair of values of a distance r and a relative speed vr.

The radar system 12 then examines the remaining part-areas TB2, TB3 of the coverage area EB to be examined in the same measuring cycle MZ1 in the same manner. In doing so, it may also store further hypotheses on reflecting objects in these remaining part-areas TB2, TB3.

If then the first part-area TB1 is examined again in a further measuring cycle MZ2, the results obtained there are used for validating the hypotheses previously formed. In one embodiment, this is done in that one or more frequency ramps with other slopes m3, m4 than in the first measuring cycle are used in the further measuring cycle MZ2. Correspondingly, further straight lines G(m3, 14), G(m3, 16), G(m4, 14) and G(m4, 16) are obtained in an r, vr diagram. Such a further straight line G(m3, 14), G(m4, 14), G(m3, 16), G(m4, 16) which extends in an expected vicinity of an intersection S1, S3 from a previous measuring cycle MZ1 validates (confirms) the hypothesis that this intersection S1, S3 concerns a pair of values from a distance r and a speed vr of a real object 14, 16. The further straight lines G(m3, 14), G(m3, 16), G(m4, 14) and G(m4, 16) do not, however, extend in the vicinity of intersections S2, S4 from a previous measuring cycle MZ1. These intersections S2, S4 are thus evaluated as ghost targets.

To be able to better separate the various straight lines G(m1, 14), G(m2, 14), G(m1, 16), G(m2, 16) and G(m3, 14), G(m3, 16), G(m4, 14), G(m4, 16) or equations of straight lines which are obtained in the various measuring cycles MZ1, MZ2 for a part-area TB1 from one another, the values and signs of the slopes m1, m2, m3, m4 of the frequency ramps (chirps) are matched to one another in the various measuring cycles MZ1, MZ2. This is preferably done in such a manner that frequency ramps, the slopes of which have the same sign, exhibit different absolute values of the slopes. In one embodiment, m1 is equal to 100 GHz/s, m3 is equal to 200 GHz/s, m2 is equal to 200 GHz/s and m4 is equal to 100 GHz/s.

In the embodiment described, a first pair of frequency ramps with slopes m1, m2 and a second pair of frequency ramps with slopes m3, m4 is therefore used alternately in successive measuring cycles MZ1, MZ2 for an in each case equal part-area, for example the part-area TB1. In this context, the respective four frequency measurements of two successive measuring cycles MZ1, MZ2 are used for forming and validating hypotheses, the first two frequency measurements being used for forming hypotheses and the further two frequency measurements being used for validation.

In other words, an optimized modulation is used which is distinguished by the fact that various frequency ramps are distributed to different measuring cycles. The hypotheses can be set up by the measurements in an arbitrary measuring cycle and validated by further measurements in the next cycle. For the formation and validation of hypotheses, other chirp parameters, for example other slope values, can be used. This resolves the target conflict between a longest possible duration of an individual measurement and a shortest possible duration of a measuring cycle comprising several individual measurements. The use of the largest possible number of different chirps increases the probability of detection in situations with several objects: since each chirp and each object supplies a straight line, only a single point of which corresponds to the object parameters r and vr, it may happen that several objects, in spite of different object parameters r and vr, supply similar or equal difference frequencies in the Fourier spectrum of the baseband signal, and thus the same straight line in the r, vr diagram. Using the largest possible number of different chirps makes it possible to resolve even points on the same straight line which increases the probability of the detection in such situations with several objects and improves the efficiency of the validation.

As an alternative to this method, the validation can also be based on more than one measuring cycle if this is required, for example due to a high number of objects.

As a further alternative, changes of pairs of combinations of distances and speeds found from measuring cycle to measuring cycle can also be used for the validation. If, for example, the intersection S1 of the straight lines G(m1, 14) and G(m2, 14) in a first measuring cycle is considered in FIG. 1, a constant relative speed vr will result in an expected value for the distance of the object 14 at a later time (range rate method).

If the intersection of the straight lines G(m1, 14) and G(m2, 14) is again formed at a later time, that is to say in a subsequent measuring cycle, and if the intersection formed again corresponds to the expected value formed previously by taking into consideration the first distance and the first speed, this is considered to be a validation of the hypothesis. In the case of a ghost target, in contrast, the intersection formed again would not correspond to the expected value, as a rule, which is considered to be a refutation of the hypothesis and reveals the intersection to be a ghost target.

In the embodiments described hitherto, the processing separated in accordance with part-areas is carried out in that the radar system 12 directs an overlay of a transmitting lobe and of an angular receiving area, defining part-areas, sequentially in different spatial directions in one measuring cycle and received radar signals are processed sequentially.

As an alternative or additionally, the processing separated in accordance with part-areas can also be carried out in that the radar system simultaneously directs overlays of at least one transmitting lobe with at least two angular receiving areas, defining part-areas, or of at least one angular receiving area with at least two transmitting lobes, into different spatial directions, wherein signals from another received signal frequency range are processed for one part-area than for another part-area.

Figure 4:
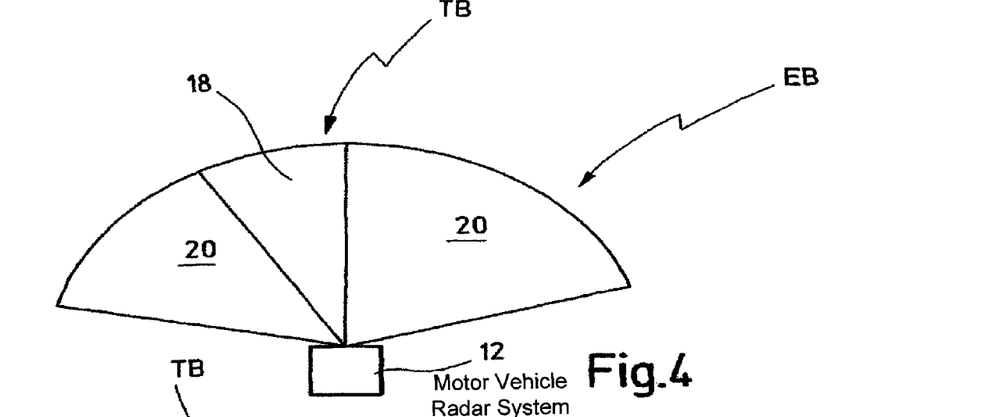
FIG. 4 a first embodiment for generating part-areas of a coverage area.
Figure 5:
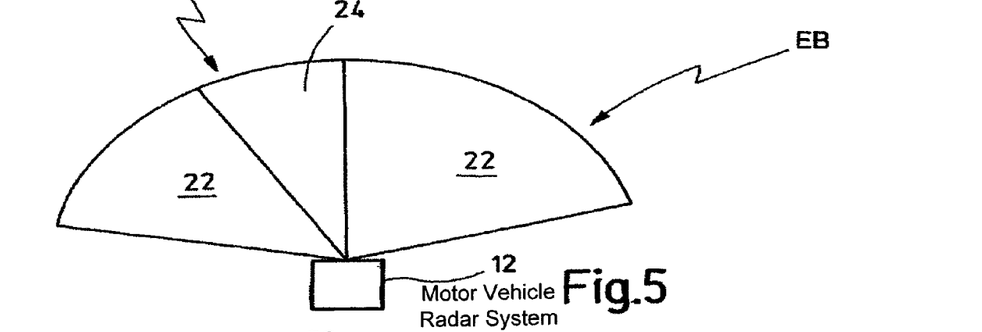
FIG. 5 a second embodiment for generating part-areas.
Figure 6:
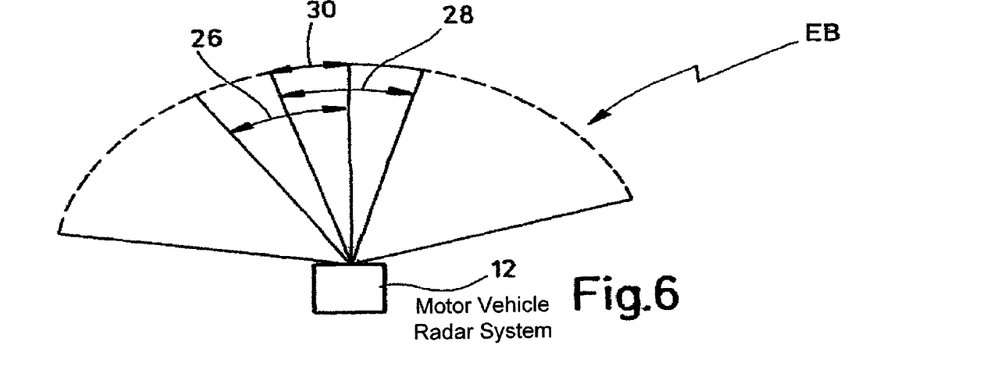
FIG. 6 a third embodiment for forming part-areas.

FIGS. 4-6 show various possibilities of implementing overlays or part-areas. In FIG. 4, a narrow transmitting lobe 18 is located in a wide angular receiving area 20 and, as a result, forms an overlay or a part-area TB. The wide angular receiving area 20 in this case corresponds to the entire coverage area EB of the radar system 12. In the operation of the radar system 12, the coverage area EB is scanned section by section by offsetting the transmitting lobe 18, and thus the part-area TB, in one embodiment.

FIG. 5 shows a complementary implementation, as it were, in which a coverage area EB is formed by a wide transmitting lobe 22. Part-areas TB are generated in this case by narrow angular receiving areas 24 by means of which the wide transmitting lobe 22 is scanned section by section.

FIG. 6 shows how an even narrower overlay 30 is generated by overlapping a narrow transmitting lobe 26 and a narrow angular receiving area 28, which is also used for scanning the coverage area EB section by section.

Figure 7:
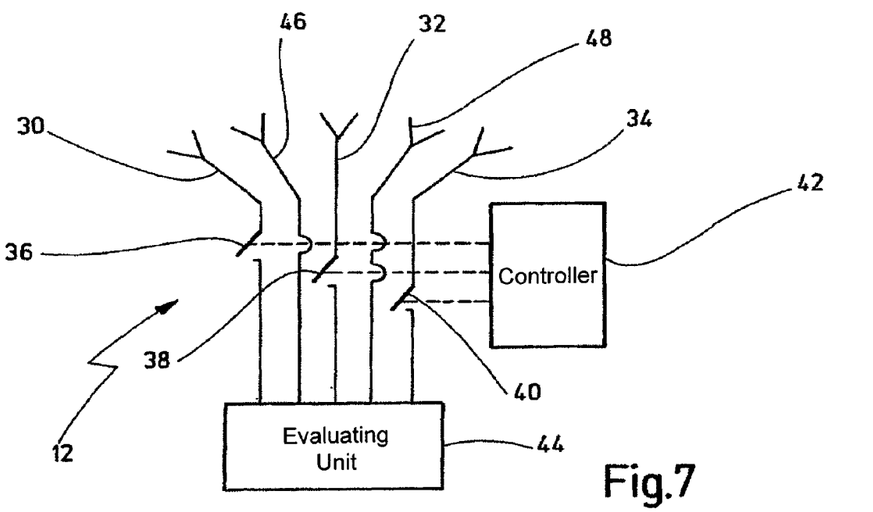
FIG. 7 a first embodiment of a radar system.

FIG. 7 shows an embodiment of a radar system 12 with several switchable transmitting antennas 30, 32, 34 which point in different spatial directions and in each case generate narrow directional transmitting lobes. The transmitting antennas 30, 32, 34 are sequentially connected to a radar signal generator and evaluating unit 44 via switches 36, 38, 40 operated by a controller 42. At least one receiving antenna 46 and/or 48 is also connected to the evaluating unit 44 and generates a wide angular receiving area which is scanned section by section by sequentially activating the transmitting antennas 30, 32, 34. The evaluating unit 44 determines from the reflected signals the object parameters r and vr including the validation by the FMCW method described above in detail.

Narrow angular receiving areas 24 are achieved, for example, by delaying the received signals from one of the receiving antennas during the signal processing. When the received signals are added, a maximum aggregate signal is obtained when peaks of the individual received signals are constructively superimposed. Considering various reflecting objects which are arranged at the same distance but different angular positions relative to the radar system in the coverage area of the radar system, the constructive superimposition is obtained for a particular, comparatively narrow angular area.

Figure 8:
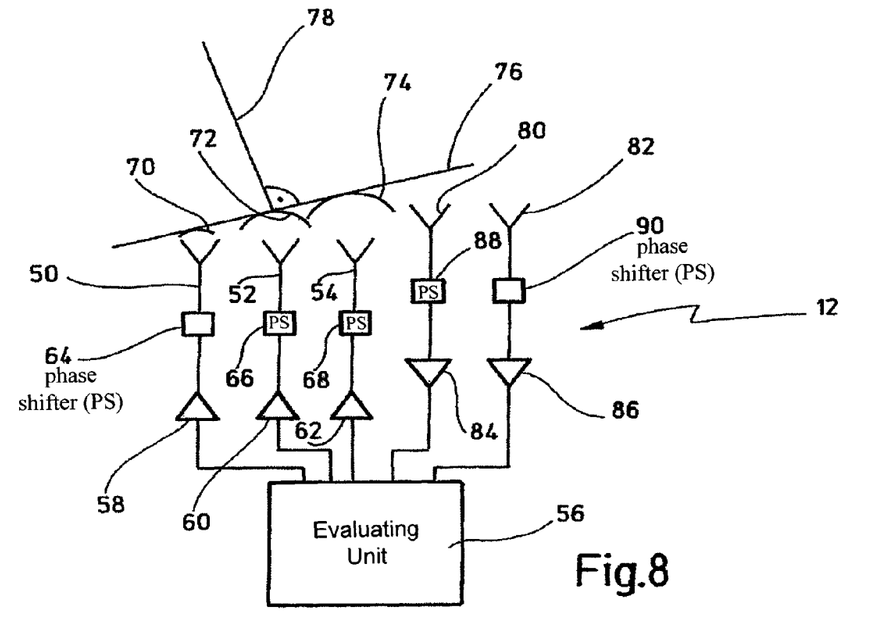
FIG. 8 a second embodiment of a radar system.

FIG. 8 shows an embodiment of a radar system 12 with electronically adjustable transmitting direction and/or receiving direction. The radar system 12 contains several transmitting antennas 50, 52, 54 which are excited into radiation of signals by a radar signal generator and evaluating unit 56 via transmitting amplifiers 58, 60, 62. In this arrangement, the transmitting antennas 50, 52, 54 are excited phase-coupled with a phase shift which is controllable by the unit 56. The phase shift is controlled by rigid or controllable phase shifters 64, 66, 68 which are arranged between the transmitting amplifiers 58, 60, 62 and the transmitting antennas 50, 52, 54. The phase shifters used are, for example, conductor sections of switchable or adjustable conductor length or controllable time delay circuits, wherein such implementations should only serve as an example in this case and their enumeration does not have a conclusive character.

As a result the transmitting antennas 50, 52, 54 radiate waves 70, 72, 74 in phase-coupled manner which are constructively superimposed to form wavefronts 76 and are radiated as a transmitting lobe directed in one preferred direction 78. The arrangement shown thus represents a possibility of a transmitting lobe generation and a phase-coupled excitation of a number of transmitting antennas 50, 52, 54 in accordance with the so-called phased-array principle. The width of the resultant transmitting lobe can be reduced with increasing number of transmitting antennas involved. Naturally, therefore, the number of antenna elements which are involved in the generation of a transmitting lobe can also be greater or less than 3.

In the embodiment of FIG. 8, at least one receiving antenna 80 and/or 82 is also provided which receives, and transfers to the evaluating unit 56, signals reflected from an object. Naturally, instead of separate receiving antennas 80 and 82, a selection of transmitting antennas followed by transmitting and receiving points can also be used for receiving reflected signals. Between the receiving antennas 80 and 82, low noise receiving amplifiers 84 and 86 and controllable phase shifters 88, 90 are connected which allow the angular receiving area to be electronically pivoted. The evaluating unit 56 determines from the reflected signals the object parameters r and vr including the validation by the FMCW method described in detail above.

Figure 9:
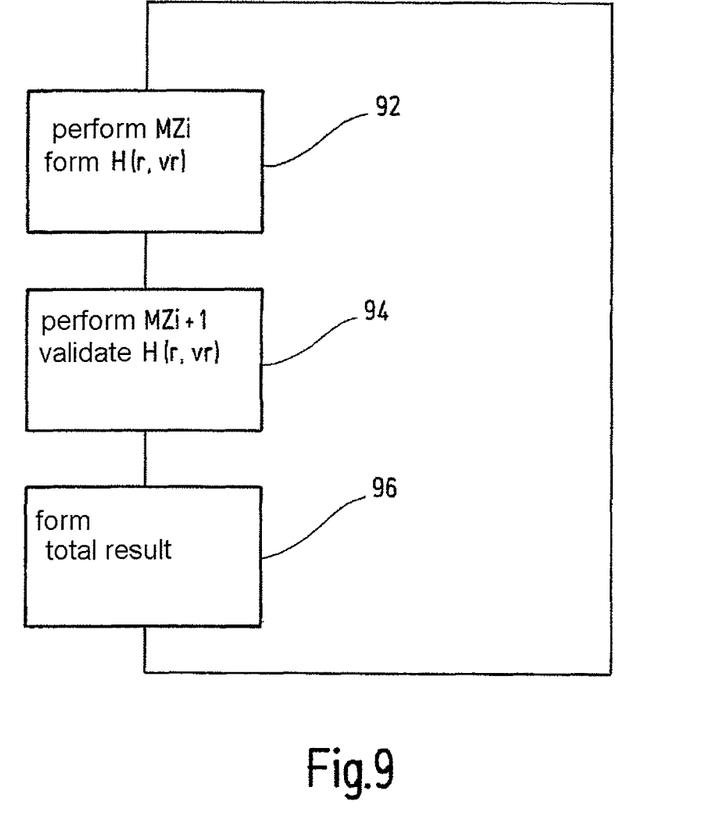
FIG. 9 a flowchart as illustrative embodiment of a method according to the invention.

In the text which follows, an illustrative embodiment of a corresponding method is explained with reference to FIG. 9.

In a first step 92, a first measuring cycle MZi is carried out. In this process, hypotheses H(r, vr) may be formed for object parameters r, vr in the manner described in detail above.

Following this, a further measuring cycle MZi+1 is carried out in a step 94 and, when hypotheses H(r, vr) are available from step 92, a validation of the object parameters r, vr of real objects to distinguish them from ghost targets.

This is followed in step 96 by an assembly of results obtained in the measuring cycles from various part-areas to find a total result differentiated in accordance with spatial directions.

The invention claimed is:

1. A method for determining speeds and distances of objects relative to a radar system of a motor vehicle, comprising:
    dividing a coverage area (EB) of the radar system into at least two part-areas;
    examining the coverage area (EB) for reflecting objects in successive measuring cycles,
    processing and separating radar signals received in a measuring cycle in accordance with the at least two part-areas;
    assembling the processed signals to form a total result differentiated in accordance with spatial directions;
    forming hypotheses from signals received in a first measuring cycle, wherein the hypotheses comprise predictions for whether an intersection of two straight lines relates to parameters of a real object or to a ghost target, by a single pair of chirps for a part-area of the first measuring cycle, for a distance and a speed of reflecting objects; and
    validating the hypotheses in dependence on signals received in at least one further measuring cycle.

2. The method according to claim 1, wherein the processing and separating in accordance with the at least two part-areas is carried out when the radar system directs an overlay of a transmitting lobe and of an angular receiving area, defining the at least two part-areas, sequentially in different spatial directions in one measuring cycle, and wherein the processing of received radar signals is carried out sequentially.

3. The method according to claim 1, wherein the processing and separating in accordance with the at least two part-areas is carried out when the radar system directs overlays of at least one transmitting lobe with at least two angular receiving areas or at least one angular receiving area with at least two transmitting lobes, defining simultaneous different part-areas, in different spatial directions, wherein, for one of the at least two part-areas, signals are processed from another received signal frequency range than for another of the at least two part-areas.

4. The method according to claim 1, wherein the hypotheses are formed by an LFMCW method in which two frequency ramps with different slope are used for each of the at least two part-areas.

5. The method according to claim 4, wherein at least four different frequency ramps, of which two are in each case located in one of two different measuring cycles, are used for the measurement and validation.

6. The method according to claim 4, wherein changes of pairs of found combinations of distances and speeds from measuring cycle to measuring cycle are used for the validation.

7. The method according to claim 4, wherein in successive measuring cycles, a first pair of frequency ramps and a second pair of frequency ramps are used alternately for in each case identical part-areas.

8. The method according to claim 7, wherein the respective four frequency measurements of two successive measuring cycles are used for forming hypotheses and validating hypotheses, wherein the first two frequency measurements are used for forming hypotheses and the further two frequency measurements are used for validation.

9. The method according to claim 7, wherein two frequencies which are measured in a first measuring cycle are used for forming hypotheses and in that frequencies which are formed in more than one further measuring cycle are used for validating the hypothesis.

10. A motor vehicle radar system which determines speeds and distances of objects relative to the motor vehicle, wherein the radar system operates based on a coverage area divided into at least two part-areas, the radar system comprising:
    a signal generator unit configured to generate a radar signal;
    at least one transmitting antenna operatively connected to the signal generator unit and configured to transmit the radar signal to the corresponding part-area;
    at least one receiving antenna configured to receive a signal reflected from a reflecting object;
    an evaluating unit operatively connected to the at least one receiving antenna,
    wherein the coverage area comprises the reflecting object, wherein the reflecting object is examined by the radar system in successive measuring cycles to process radar signals received in a measuring cycle separated in accordance with the at least two part-areas, wherein the evaluating unit is configured to assemble processed radar signals to form a total result differentiated in accordance with spatial directions, wherein the evaluating unit is arranged for forming, from signals received in a first measuring cycle, hypotheses for the distance and speed of reflecting objects and validating the hypotheses in dependence on signals received in at least one further measuring cycle, and wherein the hypotheses comprise predictions for whether an intersection of two straight lines relates to parameters of a real object or to a ghost target, by a single pair of chirps for a part-area of the first measuring cycle.

* * * * *